United States Patent
Chung et al.

(10) Patent No.: US 11,272,724 B2
(45) Date of Patent: Mar. 15, 2022

(54) LAVER-SNACK MADE OF LAVER AND CEREAL SHEETS AND PROCESS OF PRODUCING THE SAME

(71) Applicant: CJ CHEILJEDANG CORP., Seoul (KR)

(72) Inventors: Suyeon Chung, Seoul (KR); Joodong Park, Gimpo-si (KR); Changyong Lee, Seoul (KR); Jeongseok An, Seoul (KR); Soonhee Kwon, Seongnam-si (KR); Sungwoo Shine, Seoul (KR); Soyoung Yoon, Seoul (KR); Sunghee Kim, Seoul (KR)

(73) Assignee: CJ CHEILJEDANG CORP., Seoul (KR)

( * ) Notice: Subject to any disclaimer, the term of this patent is extended or adjusted under 35 U.S.C. 154(b) by 0 days.

(21) Appl. No.: 16/697,368

(22) Filed: Nov. 27, 2019

(65) Prior Publication Data

US 2020/0093162 A1     Mar. 26, 2020

Related U.S. Application Data

(62) Division of application No. 14/090,810, filed on Nov. 26, 2013.
(60) Provisional application No. 61/738,687, filed on Dec. 18, 2012.

(30) Foreign Application Priority Data

Sep. 11, 2013    (KR) ........................ 10-2013-0109209

(51) Int. Cl.
*A23P 20/20*     (2016.01)
*A23L 7/13*     (2016.01)

(52) U.S. Cl.
CPC ................. *A23L 7/13* (2016.08); *A23P 20/20* (2016.08)

(58) Field of Classification Search
USPC .................................................. 426/560, 549
See application file for complete search history.

(56) References Cited

U.S. PATENT DOCUMENTS

| | | | | |
|---|---|---|---|---|
| 3,925,567 A | * | 12/1975 | Abe | A23L 7/117 426/559 |
| 4,609,555 A | * | 9/1986 | Becher | A21D 17/002 426/102 |
| 5,188,859 A | * | 2/1993 | Lodge | A23L 7/117 426/439 |
| 5,298,268 A | * | 3/1994 | Maegli | A23P 10/35 426/103 |

(Continued)

FOREIGN PATENT DOCUMENTS

| | | |
|---|---|---|
| CN | 1269170 A | 10/2000 |
| CN | 1357262 A | 7/2002 |

(Continued)

OTHER PUBLICATIONS

Blog, Laver cookie perfect to an accompaniment for beer and nutty (http://v. daum.net/link/2558523?CT=WIDGET) Feb. 17, 2009.

(Continued)

*Primary Examiner* — Lien T Tran
(74) *Attorney, Agent, or Firm* — Cantor Colburn LLP

(57) ABSTRACT

Provided is a laver-snack produced by attaching a cereal sheet to a laver sheet to obtain a double-layer sheet and then roasting the double-layer sheet, and a method of producing the laver-snack.

6 Claims, 2 Drawing Sheets

(56) References Cited

U.S. PATENT DOCUMENTS

| | | | | |
|---|---|---|---|---|
| 2004/0022903 | A1* | 2/2004 | Takeuchi | A23G 1/36 426/98 |
| 2008/0213432 | A1 | 9/2008 | Bunke et al. | |
| 2010/0028519 | A1* | 2/2010 | Mineo | A23L 7/135 426/549 |
| 2010/0196564 | A1 | 8/2010 | Cepeda Mendoza et al. | |
| 2012/0196015 | A1* | 8/2012 | Fuentes | A21B 1/48 426/473 |
| 2014/0170291 | A1 | 6/2014 | Chung et al. | |

FOREIGN PATENT DOCUMENTS

| | | | |
|---|---|---|---|
| CN | 1623405 | * | 6/2005 |
| CN | 1623405 | A | 6/2005 |
| CN | 101513204 | A | 8/2009 |
| JP | 57115160 | A | 7/1982 |
| JP | 57118773 | A | 7/1982 |
| JP | 1984109127 | A | 6/1984 |
| JP | S602142 | A | 1/1985 |
| JP | S61-280252 | A | 12/1986 |
| JP | S62166849 | A | 7/1987 |
| JP | S64-13970 | A | 1/1989 |
| JP | S64-13972 | A | 1/1989 |
| JP | 199243986 | U | 4/1992 |
| JP | H05-088289 | U | 12/1993 |
| JP | 7313114 | A * | 12/1995 |
| JP | 3026431 | U | 4/1996 |
| JP | 2003219821 | A | 8/2003 |
| JP | 2004-229524 | A | 8/2004 |
| JP | 3605440 | B2 | 10/2004 |
| JP | 20140117280 | A | 6/2014 |
| KR | 1989-0001820 | B1 | 5/1989 |
| KR | 1019960020713 | A | 7/1996 |
| KR | 1996-0010969 | B1 | 8/1996 |
| KR | 10-144546 | B1 | 7/1998 |
| KR | 1020000065416 | A | 11/2000 |
| KR | 1020010010920 | A | 2/2001 |
| KR | 1020030035702 | A | 5/2003 |
| KR | 1020030043556 | A | 6/2003 |
| KR | 1020050072639 | A | 7/2005 |
| KR | 1020100070603 | A | 6/2010 |
| KR | 1020100072155 | A | 6/2010 |
| KR | 20100138277 | A | 12/2010 |
| KR | 101186054 | B1 | 9/2012 |
| RU | 2010143124 | A | 4/2012 |
| WO | 0024271 | A1 | 5/2000 |
| WO | 0165951 | A1 | 9/2001 |
| WO | 2011152656 | A3 | 12/2011 |

OTHER PUBLICATIONS

Blog, "Making homemade laver snack" (http://blog.naver.com/sugarrosey/70139823512) Jun. 8, 2012.

Substantive Examination Adverse Report for Malaysian Patent Application No. PI 2014003461 dated Oct. 31, 2017.

Japanese Office Action for Application No. 2016-041880 dated Dec. 21, 2016, citing the above reference(s).

European Extended Search Report for Application No. 13865929.7 dated Aug. 17, 2016, citing the above reference(s).

Blog 1, 'Laver cookie perfect to an accompaniment for beer and nutty.' Feb. 17, 2009 Retrieved from Internet: <URL: http://v.daum.net/link/2558523?CT=WIDGET>. pp. 1-8, See the whole document.

Blog 2, 'Making homemade laver snack.' Jun. 8, 2012 Retrieved from Internet: <URL: http://blog.naver.com/sugarrosey?Redirect=Log&logNo=70139823512>. pp. 1-8, See the whole document.

Blog 3, 'Homemade laver snack for a snack and an accompaniment for beer.' Apr. 17, 2011 Retrieved from Internet: <URL: http://blog.naver.com/jheui13?Redirect=Log&logNo=20126556305>. pp. 1-12, See the whole document.

International Search Report for International Application No. PCT/KR2013/010724 dated Feb. 24, 2014.

Japanese Office Action with English Translation for Application No. 2013-255704 dated Nov. 5, 2014.

Yang Jun, Green Food Processing Technology, Sep. 2010, pp. 291, Edition 1, 1st printing, Science Press.

E.G. Gorun et al., Technology and Equipment for the Production of Dry Snacks, 1972, pp. 66-89.

Russian Office Action for Russian Patent Application No. 2014147959 dated Feb. 9, 2016, citing the above reference(s).

Chinese Office Action for Chinese Patent Application No. 201310681027.7 dated Apr. 12, 2016, citing the above reference(s).

Kazakhstan Office Action with English Translation for Application No. 2014/2543.1 dated Dec. 9, 2015.

Korean Office Action dated Jul. 7, 2014 of the Korean patent application No. 10-2013-0109209, citing the above enumerated references with English translation.

Chinese Office Action with English Translation for Application No. 201310681027.7 dated Jan. 28, 2015.

Australian Office Action for Application No. 2013364757 dated Jun. 22, 2015.

D6: Haitai Confectionery & Foods, South Korea, Cracker Range, Jan. 2006, pp. 1-2. Retrieved from the Internet: <URL: http://www.gnpd.com/sinatra/recordpage/426986/from_search/zAaal0BUWV? cc=1 >.

D7: Jiahui Biscuits, China, Layer & Soda Biscuits, Jul. 2005, pp. 1-2. Retrieved from the Internet: <URL: http://www.gnpd.com/sinatra/recordpage/381756/from_search/zAaal0BUWf/ >.

Green Food Processing Technology, edited by Yang Jun, Science Press, Sep. 2010, Edition 1, 1st printing, p. 291.

CN Chinese Office Action for Chinese Patent Application No. 2017100994735.4 dated Jul. 3, 2020.

* cited by examiner

LAVER-SNACK MADE OF LAVER AND CEREAL SHEETS AND PROCESS OF PRODUCING THE SAME

RELATED APPLICATION

This application is a divisional application of U.S. application Ser. No. 14/090,810 filed Nov. 26, 2013 Now Abandon, which claims the benefit of Korean Patent Application No. 10-2013-0109209, filed on Sep. 11, 2013 in the Korean Intellectual Property Office and U.S. Patent Provisional Application No. 61/738,687 filed on Dec. 18, 2012, the disclosure of which is incorporated herein in its entirety by reference.

BACKGROUND

1. Field

One or more embodiments of the present invention relate to methods of producing laver-snacks and more particularly to novel laver-snacks produced by using cereal sheets that are useful for preparing the laver-snacks and methods of producing the laver-snacks.

2. Description of the Related Art

Laver is a popular side dish for Asians. Laver has higher protein content than other types of common seaweeds and is rich in amino acids such as alanine, aspartic acid, glutamic acid, and glycine. Laver is known as a healthy food due to its high fiber content and is also known as excellent seaweed that includes various nutrients for skin care and preventing adult diseases and cancer.

Traditionally, laver is cooked as follows: dry laver is roasted as it is, or applied with oil and salt, roasted and then cut into a suitable size to be eaten as a side dish, or rolled with rice to make gimbap (dried seaweed rolls), or used as garnish for bibimbap (rice mixed with vegetables and beef) or tteokguk (rice-cake soup), or made into kimbugak.

Kimbugak is a product similar to the present invention and is a traditional snack produced by using laver. A method of preparing the kimbugak may vary depending on the region, but the method generally includes applying a layer of seasoned glutinous rice paste on a dried laver sheet, placing another dried laver sheet thereon, applying another layer of seasoned glutinous rice paste thereon, and sprinkling various garnishes such as whole sesame seeds and the like on the layer of seasoned glutinous rice paste, and drying the same for one or two days in shade and then cutting the same into pieces of suitable size or frying.

Various methods have been developed to produce a traditional kimbugak.

Patent document 1 discloses a method of preparing kimbugak having improved taste by adding a seasoned sauce including vegetables, spices, soy sauce, anchovies, dried shrimps, salted-fermented shrimps, salted-fermented fish sauce, and the like.

Patent document 2 discloses a method of preparing kimbugak including colloidal silver, the method including adding clam soup to glutinous rice paste to add flavor, applying a layer of the glutinous rice on a dried laver sheet, spraying colloidal silver before drying the laver.

Patent document 3 discloses a method of preparing kimbugak, the method including using glutinous rice paste including at least one of dates, green tea, mulberry leaves, ginseng, mushrooms, Chinese matrimony vines, and Corni Fructus in a powder or particulate form to attach at least two laver sheets, and then drying and frying the same.

Patent document 4 discloses a method of preparing a double-layered laver, the method including attaching dried fruits, dried seeds, dried beef jerky, or dried fish jerky between laver sheets, drying the laver sheets, and then cutting and packaging the same.

As described above, various methods of preparing kimbugaks and laver-snacks have been developed. However, the kimbugaks and the laver-snacks are fried products, which have high calories and a short shelf-life of less than 6 months, thereby reducing economic feasibility and creating a large barrier for exports. Also, when the kimbugak is made by only drying lavers without frying, a cutting edge of the kimbugak may be very sharp, which may cause injuries to mucous membranes in a person's mouth, and it may be too hard and tough to chew, causing difficulties in eating. Accordingly, a laver-snack that is easier to produce and has improved preservative quality and crunchy texture is needed.

Patent Documents

1. KR 2001-0010920
2. KR 2003-0035702
3. KR 2005-0072639
4. KR 2000-0065416

SUMMARY

One or more embodiments of the present invention include laver-snacks having improved preservative quality and taste to overcome drawbacks of traditional laver-snacks such as kimbugaks, which is prepared using novel materials and methods.

Additional aspects will be set forth in part in the description which follows and, in part, will be apparent from the description, or may be learned by practice of the presented embodiments.

According to one or more embodiments of the present invention, provided is a laver-snack prepared by attaching a cereal sheet to a laver sheet to obtain a double-layer sheet and roasting the double-layer sheet.

According to other embodiments of the present invention, provided is a method of preparing a laver-snack, the method including:
applying a bonding solution to a cereal sheet;
providing a laver sheet on the cereal sheet applied with the bonding solution;
pressing the cereal sheet and the laver sheet to bond them together and prepare a double-layer sheet;
applying oil on the double-layer sheet;
sprinkling seasoning on the applied oil; and
roasting the double-layer sheet sprinkled with the seasoning in an oven.

Hereinafter, embodiments of the present invention will be described in greater detail.

All the technical terms used in the embodiments of the present invention have the same meaning as generally understood by one of ordinary skill in the art, unless defined otherwise. Also, the present specification discloses preferred embodiments and samples, but the scope of the preferred embodiments and samples includes similar or equal embodiments and samples. Contents of all publications disclosed as cited documents in the present specification are included herein in their entirety.

The inventors of the present application conducted research to develop a laver-snack having a longer shelf-life and improved crunchiness, the properties of which are absent in a conventional laver-snack. To this end, the inventors attached a cereal sheet, which is not used in a conventional method of preparing a kimbugak, to a laver sheet to produce a double-layer sheet, and roasted the double-layer sheet without frying the same, to invent a new method of producing a laver-snack. The laver-snack produced by using the method described above not only has high preservative quality because it is not fried, but also has a soft yet crunchy texture because the cereal sheet is roasted with the laver sheet, unlike a conventional laver snack that has a hard texture because it is dried after applying a layer of glutinous rice paste. As a result, problems of low preservative quality and hard texture, which were problems of the conventional kimbugak, were solved.

According to an aspect of the present invention, provided is a laver-snack obtained by attaching a cereal sheet to a laver sheet to prepare a double-layer sheet, and roasting the double-layer sheet.

As used herein, the term "cereal sheet" refers to a thin sheet of any shape that is prepared by using cereals such as rice powder and/or starch, and water. The cereal sheet may be prepared by additionally mixing rice powder to starch powder. Also, raw materials of shrimps, sesame seeds, black sesame seeds, laver powder, anchovies, squids, or a combination thereof may be added to add a unique flavor of the raw material and improve a chewing texture.

The cereal sheet may include the rice powder in an amount of, for example, about 1 part by weight to about 100 parts by weight, preferably about 1 part by weight to about 50 parts by weight, and more preferably about 20 parts by weight based on 100 parts by weight of starch. Rice for the rice powder may be white rice, unpolished rice, red rice, green rice, and/or glutinous rice. The starch may be selected from the group consisting of potato starch, sweet potato starch, tapioca starch, corn starch, rice starch, and a combination thereof, and preferably, tapioca starch may be selected. According to another embodiment of the present invention, a cereal sheet made of about 30 parts by weight of rice powder based on about 100 parts by weight of tapioca starch may be used. The cereal sheet may be a commercially available cereal sheet, or the cereal sheet may be prepared by using a method known in the art.

The cereal sheet and the laver sheet of the double-layer sheet may be used as single sheets or as one or more sheets overlapped on one another Accordingly, the laver-snack according to an embodiment of the present invention may be represented by a schematic diagram of FIG. 2, in which the cereal sheet 3 and the laver sheet 1 are used as single sheets and a bonding solution 2 exists between them, or by a schematic diagram of FIG. 3 in which two cereal sheets 3 are attached to both sides of one laver sheet 1 via a bonding solution 2. Also, two laver sheets may be attached to both sides of one cereal sheet.

A method of attaching the cereal sheet to the laver sheet to produce the double-layer sheet is not particularly limited and may be performed by any of permitted food preparation methods. More particularly, the cereal sheet may be attached to the laver sheet by using a bonding solution selected from water, salt water, starch water, and sugar solution as a medium. The bonding solution may be applied to the cereal sheet and then the laver sheet may be layered thereon, or alternatively, the bonding solution may be applied to the laver sheet and then the cereal sheet may be layered thereon to produce a double-layer sheet. Due to the properties of the cereal sheet and the laver sheet, the cereal sheet may be easily attached to the laver sheet by applying only some water on the cereal sheet.

A concentration of the salt water is not particularly limited and the concentration may be suitably selected by one of ordinary skill in the art depending on desired saltiness of the laver-snack. A type of the salt is not particularly limited and the salt may be suitably selected by one of ordinary skill in the art from a common salt, bay salt, bamboo salt, seaweed salt, processed salt, and the like.

The sugar solution may include any sugar permitted for food preparation and the sugar may be polysaccharide, oligosaccharide, disaccharide, or monosaccharide. More specifically, an aqueous solution of sugar selected from the group consisting of sugar, maltitol polyglysitol, oligosaccharide, honey, and a combination thereof may be used. A concentration of the sugar solution is not particularly limited, and may be suitably selected by one of ordinary skill in the art.

The bonding solution may further include a seasoning agent in addition to the water, the salt water, the starch water, or the sugar solution. The seasoning agent may be added to further add desired taste to the laver-snack. The seasoning agent may be any seasoning agent permitted in food preparation, and the seasoning agent may be selected from a lemon concentrate solution, a ginger concentrate solution, a plum concentrate solution, green tea powder, a cinnamon syrup, a shrimp extract, a katsuobushi extract, an herb extract, a bulgogi (Korean-style barbecued beef)-flavor or lime-flavor seasoning.

The laver-snack according to an embodiment of the present invention may be produced by applying oil on the double-layer sheet obtained by attaching the cereal sheet to the laver sheet, sprinkling seasoning thereon, and roasting the same. The flavor of the laver-snack may be improved by applying the oil and various flavors may be added depending on the type of the seasoning sprinkled thereon.

The oil may be any oil permitted for food preparation, and more specifically, the oil may be corn oil, soybean oil, canola oil, grape seed oil, sunflower oil, sesame seed oil, perilla seed oil, or a combination thereof. Vanilla, cinnamon, butter, or the like may be added to the oil to improve taste and flavor. An antioxidant may be added to the oil to improve preservative quality. The antioxidant may be any antioxidant known in the art to inhibit oxidation of oil, and may be, for example an herb extract, a grapefruit extract, a tea extract, tocopherol, or tea catechin.

The seasoning may be any seasoning suitable for desired taste of the laver-snack. The seasoning is not particularly limited as long as the seasoning is permitted for food preparation, and more specifically, the seasoning may be selected from the group consisting of sugar, salt, pepper, tumeric, wasabi, green tea, bulgogi, kimchi, tteok-bok-ki (stir-fried rice cake), lime, and a combination thereof. The seasoning may be sprinkled before or after roasting the double-layer sheet in an oven, depending on the type of the seasoning.

The laver-snack according to the present invention may be roasted by any method known in the art, but it is preferable to roast it in an oven, and more specifically, in an oven at a temperature of about 200° C. to about 270° C., or in a superheated steam oven at a temperature of about 150° C. to about 380° C.

The laver-snack may be cut into a suitable size and shape before roasting to prepare a laver-snack having a desired shape and size.

According to another aspect of the present invention, provided is a method of preparing a laver-snack, the method including:

applying a bonding solution to a cereal sheet;

layering a laver sheet on the cereal sheet applied with the bonding solution;

pressing the cereal sheet and the laver sheet to bond the same and prepare a double-layer sheet;

applying oil on the double-layer sheet;

sprinkling seasoning on the applied oil; and roasting the double-layer sheet sprinkled with the seasoning in an oven.

When pressing the cereal sheet and the laver sheet to bond the same, any bonding method may be used, for example, a roller or a press machine. To this end, a specific shape may be carved or curves may be added to a surface of the roller or the press machine to create a specific shape or curves to a surface of the double-layer sheet when the double-layer sheet is being formed, to thereby engrave a specific shape or curves on the final laver-snack formed. The roller or the press machine may be commonly used for food preparation, and are well known in the art.

The preparation method may further include cutting the laver sheet sprinkled with seasoning before roasting in an oven. A laver-snack having desired size and shape may be obtained due to the cutting. The laver-snack may be roasted first and then cut into a suitable size, but when the laver-snack is cut after being roasted, crumbs may be formed, or the laver-snack may be difficult to cut into a desired shape. Any method may be used to cut the laver-snack, and more specifically, roller cutting, ultrasonic vibration cutting, or laser cutting may be used, and these methods are well known in the art.

According to an embodiment, when roasting the sheet in an oven, the sheet may be roasted in an oven at a temperature of about 200° C. to about 270° C., or in a superheated steam oven at a temperature of about 150° C. to about 380° C.

According to an embodiment, a portion of the oven that is on the side of the cereal sheet and a portion of the oven that is on the side of the laver sheet may be set to have different temperatures to maximize roasting effects. This is because the laver sheet and the cereal sheet of the double-layer sheet are made of different ingredients and thus, have different optimal roasting temperatures. For example, the portion of the oven that is on the side of the cereal sheet may be adjusted to about 240° C. to about 260° C. and the portion that is on the side of the laver sheet may be about 210° C. to about 230° C. A period of time the product passes through the oven may be about 30 seconds to about 3 minutes. The product may be roasted more evenly when hot wind is supplied to the oven.

When a temperature of the oven is not adjustable, strength of the hot wind supplied to the oven at a temperature of about 210° C. may be adjusted to about 7 (for the cereal sheet): 3 (for the laver sheet).

After roasting the double-layer sheet in the oven to prepare the laver-snack, the laver-snack may be cooled and then packaged.

Processes of the method of preparing the laver-snack according to an embodiment of the present invention are shown in FIG. 1.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
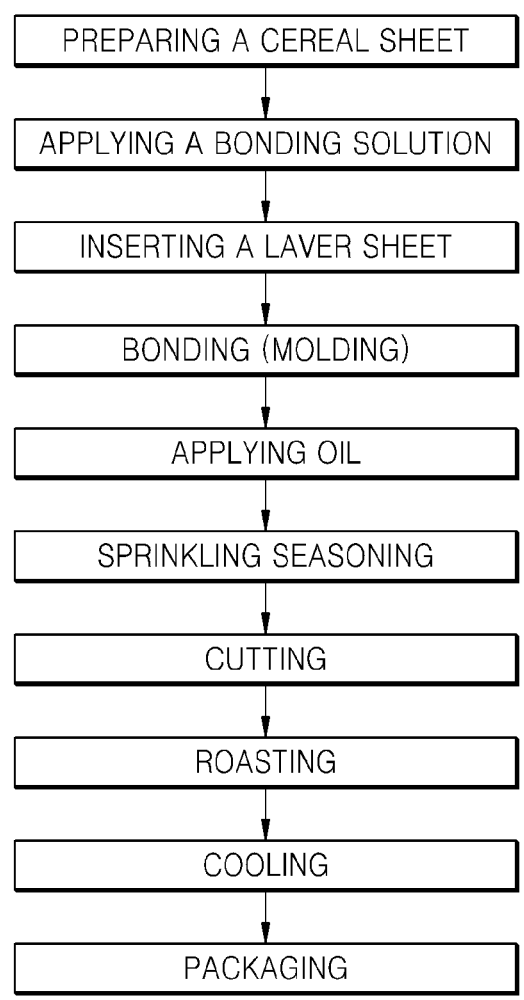
FIG. 1 illustrates processes of a method of preparing a laver-snack according to an embodiment of the present invention.
Figure 2:
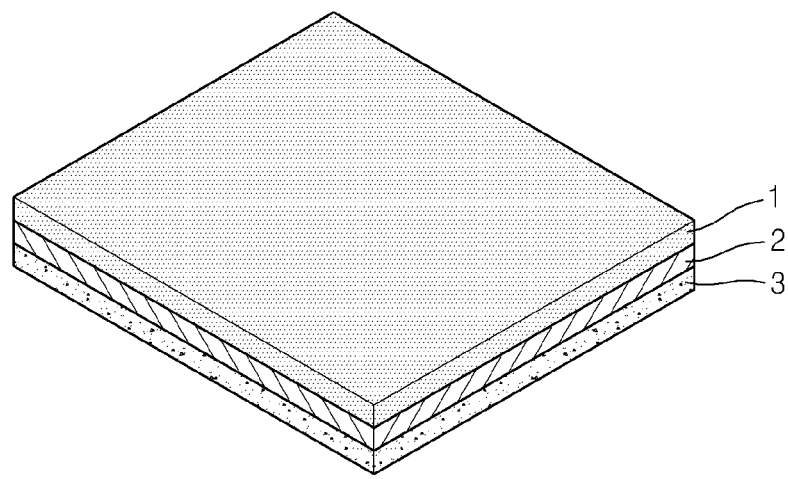
FIG. 2 is a schematic diagram of a laver-snack according to an embodiment of the present invention.
Figure 3:
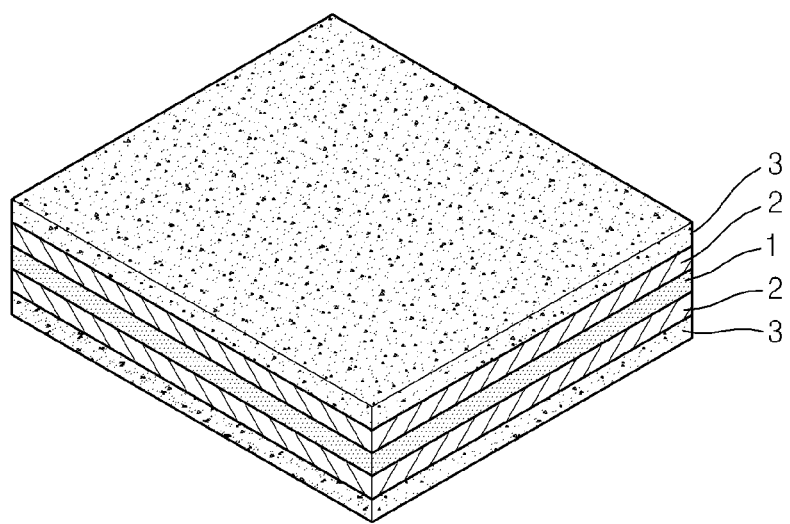
FIG. 3 is a schematic diagram of a laver-snack according to another embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Example 1

Preparing a Laver-snack

Drinking water (purified water) was suitably applied on a cereal sheet as a bonding solution, a laver sheet was layered thereon and a roller was used to attach the laver sheet to the cereal sheet to form a double-layer sheet. Thereafter, corn oil including 1 wt % of an herb extract was applied on the double-layer sheet and a bulgogi seasoning was suitably sprinkled thereon. Thereafter, the double-layer sheet was cut into a size of 4×4 cm by roller cutting. Then, a temperature of the oven was adjusted to 250° C. for a portion that is on the side of the cereal paper and 220° C. for a portion that is on the side of the laver sheet and then the double-layer sheet was passed through the oven for one minute. Also, a specially manufactured double conveyer belt was used to prevent changes in shape when the double-layer sheet passed through the oven. Thereafter, the prepared laver-snack was cooled at room temperature to complete the laver-snack.

Example 2

Preparing a Laver-snack (2)

A laver-snack was produced in the same manner as in Example 1, except that the double-layer sheet was roasted by passing it for 40 seconds through a superheated steam which was set to have internal temperature of about 180° C. and the temperature of superheated steam of about 350° C.

Example 3

Preparing a Laver-snack (3)

A laver-snack was produced in the same manner as in Example 1, except that 15 wt % of salt water was used as the bonding solution.

Example 4

Preparing a Laver-snack (4)

A laver-snack was produced in the same manner as in Example 1, except that common drinking water including 5 wt % of concentrated lemon juice was used as the bonding solution.

Example 5

Preparing a Laver-snack (5)

A laver-snack was produced in the same manner as in Example 1, except that mixed oil in which canola oil and sesame seed oil were mixed at a ratio of 5:5 was used instead of corn oil.

Example 6

Preparing a Laver-snack (6)

A laver-snack was produced in the same manner as in Example 1, except that high oleic sunflower oil was used instead of corn oil as the bonding solution and an herb extract and a tea extract were mixed therein (0.2% of the sunflower oil).

Example 7

Preparing a Laver-snack (7)

A laver-snack was produced in the same manner as in Example 1, except that laver sheets were attached to the upper side and the lower side of the cereal sheet to form a laver-snack having a sandwich form.

Example 8

Preparing a Laver-snack (8)

A laver-snack was produced in the same manner as in Example 1, except that cereal sheets were attached to the upper side and the lower side of the laver sheet to form a laver-snack having a sandwich form.

As described above, according to the one or more of the above embodiments of the present invention, the laver-snack is produced by oven roasting, and thus has a crunchy texture and has a shelf-life that is at least 1.5 times as long as a conventional laver-snack. When the laver-snack is oven roasted, the cereal sheet is roasted with the laver sheet to improve the crunchy texture and to add a unique flavor of the cereal sheet, thereby producing a flavorful laver-snack. Accordingly, unlike a conventional kimbugak that is produced by applying a glutinous rice paste layer on a laver sheet and then drying the same, the laver-snack according to an embodiment of the present invention may have a crunchy texture without hardness. More importantly, the laver-snack according to an embodiment of the present invention may have a crunchy texture without being fried in oil and thus, the laver-snack has a longer shelf-life than the conventional kimbugak produced by frying in oil. Accordingly, a laver-snack having a desired preservative quality and crunchy texture may be produced.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of preparing a laver-snack, the method comprising:
    applying a bonding solution to a cereal sheet;
    layering a layer sheet on the cereal sheet applied with the bonding solution;
    pressing the cereal sheet and the layer sheet to bond them together and prepare a double-layer sheet;
    applying oil on the double-layer sheet; and
    roasting the double-layer sheet applied with the oil in an oven,
    wherein a portion of the oven that is on the side of the cereal sheet is adjusted to 240° C. to 260° C., and a portion of the oven that is on the side of the layer sheet is adjusted to 210° C. to 230° C.,
    wherein the cereal sheet comprises a rice powder in an amount of 1 part by weight to 100 part by weight based on 100 part by weight of starch,
    wherein the starch is selected from the group consisting of potato starch, sweet potato starch, tapioca starch, and a combination thereof,
    wherein the oil is selected from the group consisting of corn oil, soybean oil, canola oil, grape seed oil, sunflower oil, sesame seed oil, perilla seed oil, or a combination thereof, and
    wherein the bonding solution is only water.

2. The method of claim 1, the method comprising using a roller or a press machine when pressing the cereal sheet and the layer sheet to bond them together and prepare the double-layer sheet.

3. The method of claim 2, wherein a surface of the roller or the press machine has a specific shape or curves carved thereon to create a specific shape or curves on a surface of the double-layer sheet.

4. The method of claim 3, the method further comprising cutting the double-layer sheet before roasting it in an oven.

5. The method of claim 4, wherein the cutting is performed by roller cutting, ultrasonic vibration cutting, or laser cutting.

6. The method of claim 1, the method further comprising sprinkling seasoning on the roasted double-layer sheet.

* * * * *